F. W. CALDWELL.
BEARING.
APPLICATION FILED JULY 9, 1915.

1,192,750.

Patented July 25, 1916.

Inventor:
Frederick W. Caldwell,
by
His Attorney.

UNITED STATES PATENT OFFICE.

FREDERICK W. CALDWELL, OF SCHENECTADY, NEW YORK, ASSIGNOR TO GENERAL ELECTRIC COMPANY, A CORPORATION OF NEW YORK.

BEARING.

1,192,750.　　　　Specification of Letters Patent.　　Patented July 25, 1916.

Application filed July 9, 1915.　Serial No. 38,982.

*To all whom it may concern:*

Be it known that I, FREDERICK W. CALDWELL, a citizen of the United States, residing at Schenectady, county of Schenectady, State of New York, have invented certain new and useful Improvements in Bearings, of which the following is a specification.

My invention relates to bearings for taking the end thrust or pull of shafts, my aim being to make the bearing simple and inexpensive to manufacture and at the same time such that it can be employed satisfactorily under conditions of heavy thrust.

In particular, I aim to secure satisfactory operation of bearings whose contact surfaces (whether initially or as the result of wear or temperature conditions) are not perfectly true; and for this purpose I provide for such relative tilting of portions of at least one of the relatively rotating bearing members as may be necessary to accommodate its bearing surface to the iregularities of the other member.

I have hereinafter illustrated and described a step bearing for a vertical water-wheel generator which is the best embodiment of the invention at present known to me. However, while the invention extends even to the specific features and details herein set forth, it is not confined thereto, but can be otherwise carried out and applied, and can be embodied in bearings between rotating parts as well as in those between rotating and stationary parts.

Figure 1:
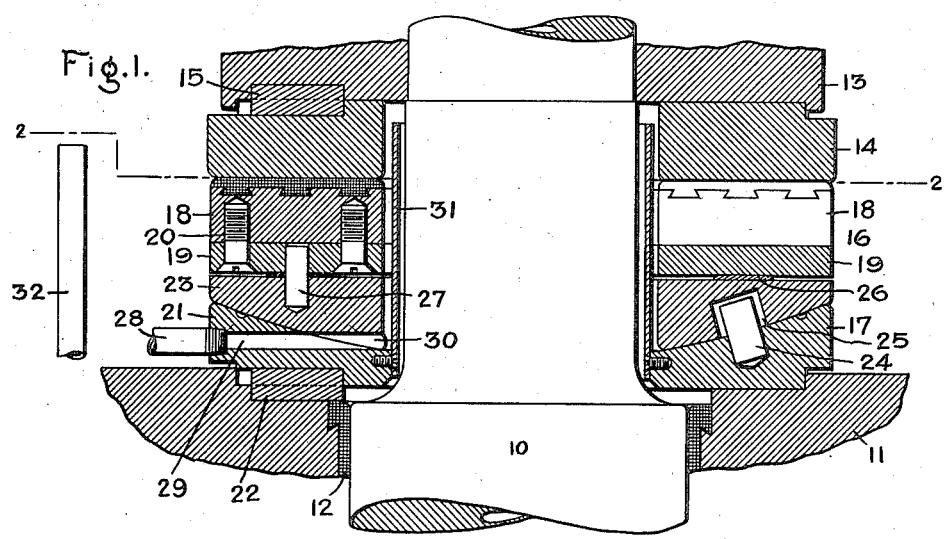
Figure 2:
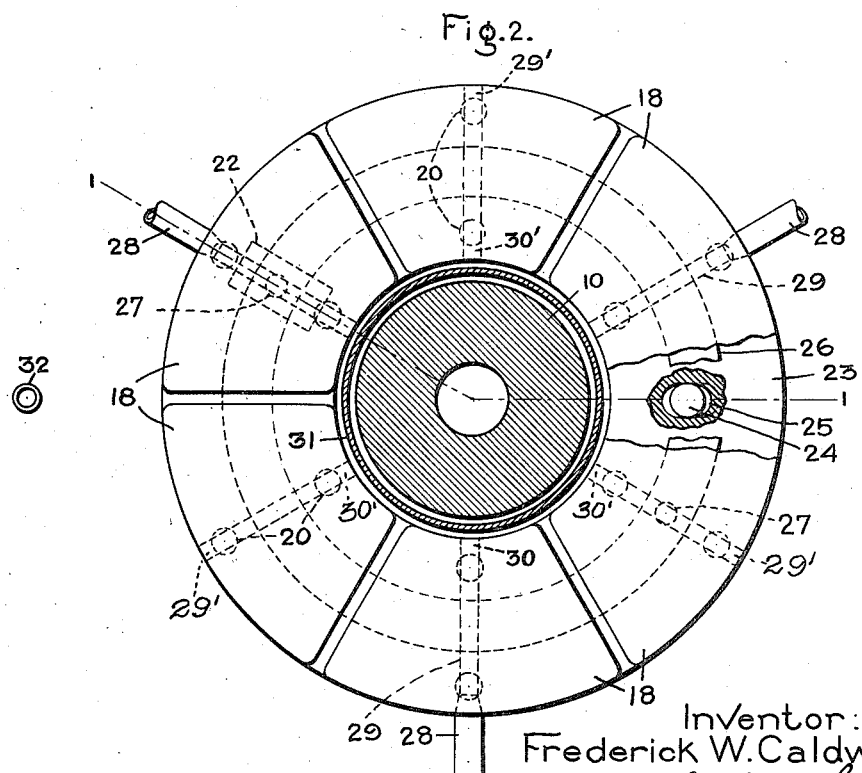

In the accompanying drawing Figure 1 is a view of the bearing in axial section at a surface corresponding to the line 1—1 of Fig. 2. Fig. 2 is a plan view of parts below the line 2—2 in Fig. 1, certain parts being in section and one being partly broken away.

As shown in Figs. 1 and 2, the step bearing for the vertical water-wheel and generator shaft 10 rests on the machine frame 11 just above the ordinary bearing 12. This step bearing has relatively rotating upper and lower bearing blocks, the upper one comprising a part 13 suitably secured to the shaft 10 and an annular bearing member proper 14 keyed to said part 13 at 15 so as to turn with the shaft, and the lower one comprising a stationary annular bearing member 16 that receives the end thrust of the shaft on the rotating member 14 and a stationary support part 17 that rests directly on the machine frame 11 and supports the member 16. The stationary annular bearing member 16 being in the present case intended to accommodate irregularities as above set forth, it is made resiliently yielding and flexible so that it may tilt locally in radial planes. As shown, the necessary thinness and resilience for flexibility is combined with other qualities desirable for satisfactory running under heavy load by constructing this stationary bearing member 16 of a number of more or less stiff or rigid sector-like segments 18 (shown as faced with Babbitt or other suitable material) flexibly united by means of a suitably springy, flexible ring 19 to the upper side of which they are secured or attached at 20. As shown, each bearing segment 18 is attached to the ring 19 by means of two bolts 20, 20 lying on a mid-radius: this allows the segments to tilt freely relatively to one another in radial planes, as hereinafter set forth, and also gives them the maximum freedom of independent expansion and contraction and so avoids danger of buckling due to local heating of the bearing. The support 17 is in two pieces, one a spherical surfaced seat element 21 resting in a depression in the frame 11 and keyed thereto at 22 so that it is held stationary, and the other a correspondingly surfaced ball element 23 resting therein. These elements 21 and 23 are restrained from relative turning by a pin or dowel 24 secured in the former with its upper end in an elongated hole 25 in the latter. Together they take care of any slight warping of the shaft 10 or any deviation of the bearing surfaces of the members 14 and 16 from perpendicularity to the said shaft.

The annular bearing member 16 is supported on the element 23 of the part 17 by annularly arranged pivotal means shown as consisting of a continuous thin, flat ring 26 interposed between the lower side of the ring 19 and the part 17 and held in place by two pins or dowels 27, 27 which are secured in the element 23 and extend up into holes in the ring 19 so as to keep the member 16 from turning. The pivotal action of this annular supporting means 26 is due to its being so narrow in width relatively to the member 16, as to permit the bearing segments 18 to tilt in radial planes with reference thereto and to the part 17. Absolutely, of course, this tilting is slight; but it suffices to dispense with the extreme care otherwise necessary in the manufacture of large bearings and to accommodate irregularities in either bearing due to wear or to variations in temperature, etc.

Lubrication of the bearing is provided for by three supply pipes 28 that discharge through alined horizontal radial holes 29 and 30 in the parts 21 and 23 into the annular space around the shaft 10 within the parts 14, 16 and 23. As shown, there is a circular shield or dam 31 bolted to the inner edge of the seat part 21, and an overflow discharge pipe 32 keeps the oil below the top of this dam. The object of this dam and overflow arrangement is to keep the parts below the step bearing from being flooded with oil; at the same time, all the relatively moving surfaces are kept submerged and the oil is caused to flow outward between the bearing segments 18 where it will lubricate the lower surface of the member 14 by direct contact and be carried between the members 14 and 16 by surface friction.

Midway between the passages 29, 30 through which the three supply pipes 28 discharge as above set forth are three similar but open-ended passages 29', 30' through the parts 21 and 23. Oil fed outward between the bearing surfaces and through the grooves separating the segments 18 by the centrifugal action of the bearing member 14 rotating above returns through these passages 29', 30', so that a continuous circulation is maintained in the bearing itself.

What I claim as new and desire to secure by Letters Patent of the United States, is,—

1. A thrust bearing comprising relatively rotating annular bearing members in contact with one another and receiving the end thrust of the shaft one from the other, one of said bearing members being thin and flexible, and annularly arranged pivotal supporting means associated with said latter bearing member and permitting local tilting thereof in radial planes.

2. A thrust bearing comprising a bearing member rotating with the shaft, a stationary bearing member receiving the end thrust of the shaft on said rotating member, one of said bearing members comprising a plurality of annularly arranged flexibly united bearing segments, and annularly arranged supporting means associated with said latter bearing member and permitting said segments to tilt in radial planes to accommodate irregularity of the bearing members.

3. A thrust bearing comprising a bearing member rotating with the shaft, a stationary annular bearing member receiving the end thrust of the shaft on said rotating member and itself comprising a plurality of flexibly united bearing segments, and relatively narrow annular supporting means for said annular bearing member so arranged as to permit said segments to tilt in radial planes.

4. A thrust bearing comprising a bearing member rotating with the shaft, a stationary annular bearing member receiving the end thrust of the shaft on said rotating member, one of said bearing members comprising a plurality of annularly arranged flexibly united rigid bearing segments, a support associated with said latter bearing member, and a relatively narrow flat ring interposed between said annular bearing member and said support so as to permit said segments to tilt in radial planes.

5. A thrust bearing comprising a bearing member rotating with the shaft, a stationary annular bearing member receiving the end thrust of the shaft on said rotating member and itself comprising a flexible ring and a plurality of bearing segments attached to said ring, and annularly arranged supporting means for said annular bearing member permitting said segments to tilt in radial planes.

6. A thrust bearing comprising a bearing member rotating with the shaft, a stationary annular bearing member itself comprising a flexible ring and a plurality of bearing segments bolted to one side thereof and receiving the end thrust of the shaft on said rotating member, relatively narrow annular supporting means at the other side of said ring, and a support for said means comprising coacting spherical surfaced seat and ball elements.

In witness whereof, I have hereunto set my hand this 8th day of July, 1915.

FREDERICK W. CALDWELL.